US008438265B2

(12) United States Patent
Biran et al.

(10) Patent No.: US 8,438,265 B2
(45) Date of Patent: May 7, 2013

(54) METHOD OF OFFLOADING ISCSI PDU CORRUPTION-DETECTION DIGEST GENERATION FROM A HOST PROCESSING UNIT, AND RELATED ISCSI OFFLOAD ENGINE

(75) Inventors: Giora Biran, Zichron-Yaakov (IL); Vadim Makhervaks, Austin, TX (US); Leah Shalev, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/163,958

(22) Filed: Nov. 4, 2005

(65) Prior Publication Data

US 2006/0095567 A1  May 4, 2006

(30) Foreign Application Priority Data

Nov. 4, 2004  (EP) ..................... 04300757

(51) Int. Cl.
*G06F 15/173*  (2006.01)

(52) U.S. Cl.
USPC ............................................ 709/224

(58) Field of Classification Search ............ 709/224
See application file for complete search history.

(56) References Cited

U.S. PATENT DOCUMENTS

| | | | | |
|---|---|---|---|---|
| 5,072,449 A * | 12/1991 | Enns et al. | ................. | 714/776 |
| 5,121,396 A * | 6/1992 | Irvin et al. | ................. | 714/807 |
| 5,282,214 A * | 1/1994 | Dravida | ................. | 714/757 |
| 5,754,564 A * | 5/1998 | Francis | ................. | 714/752 |
| 7,249,306 B2 * | 7/2007 | Chen | ................. | 714/758 |
| 7,496,695 B2 * | 2/2009 | Go et al. | ................. | 710/22 |
| 2004/0062267 A1 * | 4/2004 | Minami et al. | ................. | 370/463 |
| 2004/0123013 A1 * | 6/2004 | Clayton et al. | ................. | 710/310 |
| 2005/0165980 A1 * | 7/2005 | Clayton et al. | ................. | 710/22 |
| 2005/0283545 A1 * | 12/2005 | Zur et al. | ................. | 710/36 |
| 2006/0015655 A1 * | 1/2006 | Zur et al. | ................. | 710/5 |
| 2006/0056435 A1 * | 3/2006 | Biran et al. | ................. | 370/412 |
| 2006/0114909 A1 * | 6/2006 | Uzrad-Nali et al. | ................. | 370/394 |
| 2007/0237153 A1 * | 10/2007 | Slaughter et al. | ................. | 370/392 |
| 2009/0073884 A1 * | 3/2009 | Kodama et al. | ................. | 370/235 |

OTHER PUBLICATIONS

Cravotta, Nicholas. "Storage processor offers complete TOE offload." [Retreived online on Mar. 19, 2009] Feb. 5, 2004. [Retreived from the Internet] <URL:www.edn.com>.*

* cited by examiner

*Primary Examiner* — Joseph Avellino
*Assistant Examiner* — James Baron
(74) *Attorney, Agent, or Firm* — Scully, Scott, Murphy & Presser, P.C.; Joseph P. Abate, Esq.

(57) ABSTRACT

A method of offloading, from a host data processing unit (205), the generation of data corruption-detection digests for iSCSI PDUs to be transmitted as TCP segments over respective TCP connections. An iSCSI layer processing software (310) executed by the host data processing unit provides a command descriptor list (320) containing command descriptors adapted to identify portions of at least one iSCSI PDU to be transmitted, and data corruption-detection digest descriptors (CRC DESC(PDUa); CRC DESC(PDUb)), each one associated with a respective PDU data corruption-detection digest. An iSCSI processing offload engine (223) transmits the iSCSI PDU over the respective TCP connection, based on the descriptors in the command descriptor list; during the transmission, the iSCSI PDU data corruption-detection digest are calculated, and the calculated data corruption-detection digest is saved in the corresponding data corruption-detection digest descriptor in the command descriptor list.

18 Claims, 5 Drawing Sheets

METHOD OF OFFLOADING ISCSI PDU CORRUPTION-DETECTION DIGEST GENERATION FROM A HOST PROCESSING UNIT, AND RELATED ISCSI OFFLOAD ENGINE

TECHNICAL FIELD

The present invention relates generally to the field of data processing systems networks, or computer networks, and particularly to the aspects concerning the transfer of storage data over computer networks, in particular networks relying on protocols like the TCP/IP protocol (Transmission Control Protocol/Internet Protocol).

BACKGROUND ART

In the past years, data processing systems networks (hereinafter simply referred to as computer networks) and, particularly, those computer networks that rely on the TCP/IP protocol, have become very popular.

One of the best examples of computer network based on the TCP/IP protocol is the Ethernet, which, thanks to its simplicity and reduced implementation costs, has become the most popular networking scheme for, e.g., LANs (Local Area Networks), particularly in SOHO (Small Office/Home Office) environments.

The data transfer speed of computer networks, and particularly of Ethernet links, has rapidly increased in the years, passing from rates of 10 Mbps (Mbits per second) to 10 Gbps.

The availability of network links featuring high data transfer rates is particularly important for the transfer of data among data storage devices over the network.

In this context, the so-called iSCSI, an acronym which stands for "internet SCSI" (Small Computer System Interface) has emerged as a new protocol used for efficiently transferring data between different data storage devices over TCP/IP networks, and particularly the Ethernet. In very general terms, iSCSI is an end-to-end protocol that is used to transfer storage data between so-called SCSI data transfer initiators (i.e., SCSI devices that start an Input/Output—I/O—process, e.g., application servers, or simply users' Personal Computers—PCs—or workstations) to SCSI targets (i.e., SCSI devices that respond to the requests of performing I/O processes, e.g., storage devices), wherein both the SCSI initiators and the SCSI targets are connected to a TCP/IP network.

The iSCSI protocol has been built relying on two per-se widely used protocols: from one hand, the SCSI protocol, which is derived from the world of computer storage devices (e.g., hard disks), and, from the other hand, the TCP/IP protocol, widely diffused in the realm of computer networks, for example the Internet and the Ethernet.

Without entering into excessive details, known per-se, the iSCSI protocol is a SCSI transport protocol that uses a message semantic for mapping the block-oriented storage data SCSI protocol onto the TCP/IP protocol, which instead takes the form of a byte stream; SCSI commands can thus be transported over the TCP/IP network: the generic SCSI Command Descriptor Block (CDB) is encapsulated into an iSCSI data unit, called Packet or Protocol Data Unit (PDU), which is then sent to the TCP layer (and lower processing layers) for being transmitted over the network to the intended destination SCSI target; similarly, a response from the SCSI target is encapsulated into an iSCSI PDU and forwarded to the target's TCP layer (and lower processing layers) for being transmitted over the network back to the originating SCSI initiator.

Recently, the fast increase in network data transfer speeds, that have outperformed the processing capabilities of most of the data processors (Central Processing Units—CPUs—or microprocessors), has however started posing some problems.

The processing of the iSCSI/TCP/IP protocol aspects is usually accomplished by software applications, running on the central processors (CPUs) or microprocessors (the host central processors) of the PCs, workstations, server machines, or storage devices that are connected to the computer network. This is not a negligible task for the host central processors: for example, a 1 Gbps network link, rather common nowadays, may constitute a significant burden to a 2 GHz host central processor of, e.g., a computer or workstation being an application server in the computer network: the server's CPUs may in fact easily spend half of its processing power to perform relatively low-level processing of TCP/IP protocol-related aspects of the data to be sent/received over the computer network, with a consequent, inevitable reduction in the processing power left available to the other running software applications.

In other words, despite the impressive growth in computer networks' data transfer speeds, the relatively heavy processing overhead required by the adoption of the iSCSI/TCP/IP protocol constitutes one of the major bottlenecks against efficient data transfer and against a further increase in data transfer rate over computer networks. This means that, nowadays, the major obstacle against increasing the network data transfer rate is not the computer network transfer speed, but rather the fact that the iSCSI/TCP/IP protocol stack is processed (by the CPUs of the networked SCSI devices exchanging the storage data through the computer network) at a rate less than the network speed. In a high-speed network it may happen that a CPU of a SCSI device has to dedicate more processing resources to the management of the network traffic (e.g., for reassembling data packets received out-of-order) than to the execution of the software application(s) it is running.

A significant burden on the host CPU is in particular posed by the management of data integrity validation.

The iSCSI data units, the so-called PDUs, include each a PDU header portion and, optionally (depending on the PDU type), a PDU payload portion. On the contrary, the TCP/IP protocol is a byte-stream protocol, which treats the data received from the Upper Layer Protocols (ULPs) as a simple stream of eight-bit bytes, without any particular boundary. The TCP layer groups together a certain number of bytes received from the ULPs, to form a so-called TCP segment, which is then transmitted. Thus, for the TCP layer there are no identifiable boundaries between the iSCSI PDU internal portions and between the different PDUs.

Additionally, while the TCP/IP protocol is intrinsically (and deliberately) vulnerable, lacking the possibility of providing strong data integrity validation (a simple checksum is in fact used to protect a TCP/IP segment), the iSCSI protocol implements instead a relatively strong mechanism for allowing data corruption detection/protection, which allows exploiting up to two corruption-detection digests or CRCs (Cyclic Redundant Codes) per PDU: a first CRC may be provided in a PDU for protecting the PDU header, whereas a second CRC may be provided for protecting the PDU payload (when present).

The generation of the CRCs for the PDUs is one of the computing-intensive aspects of the iSCSI protocol implementation, particularly considering that it usually happens that TCP segments need to be retransmitted, because not acknowledged by the intended destination (for example, due to packet losses): a retransmit operation involves retransmitting TCP segments starting from the byte, in the byte stream received at the TCP layer, that was transmitted with the first not acknowledged packet. Since the TCP layer is not aware of any iSCSI PDU boundary, the generation of CRCs for retransmit is particularly complex.

Solutions for at least partially reducing the burden of processing the low-level TCP/IP protocol aspects of the network traffic on host central processors of application servers, file servers, PCs, workstations, storage devices have been proposed. Some of the known devices are also referred to as TCP/IP Offload Engines (TOEs).

Basically, a TOE offloads the processing of the TCP/IP protocol-related aspects from the host central processor to a distinct (accelerator) hardware, typically embedded in the Network Interface adapter Card (NIC) of, e.g., the PC or workstation, by means of which connection to the computer network is accomplished.

A TOE can be implemented in different ways, both as a discrete, processor-based component with a dedicated firmware, or as an ASIC-based component, or as a mix of the previous two solutions.

By offloading TCP/IP protocol processing, the host CPU is at least partially relieved from the significant burden of processing the protocol stacks, and can concentrate more of its processing resources on the running applications.

However, since the TCP/IP protocol stack was originally defined and developed for software implementation, the implementation of the processing thereof in hardware poses non-negligible problems, such as how to achieve effective improvement in performance and avoid additional, new bottlenecks in a scaled-up implementation, and how to design an interface to the ULPs, that are still implemented in software and under the responsibility of the host CPU.

Offloading from a host CPU only the processing of the TCP/IP protocol-related aspects, as the known TOEs do, may be not sufficient to achieve the goal of significantly reducing the processing resources that the host CPU has to devote to the handling of data traffic over the network: some of the aspects peculiar of the iSCSI protocol may still cause a significant burden on the host CPU. Thus, in order to effectively relieve the host CPU, TOE engines should also perform some iSCSI processing, in addition to perform TCP/IP protocol processing.

Particularly, an aspect of iSCSI that is advantageously offloaded from the host CPU to a hardware accelerator is the handling of iSCSI PDUs' CRCs (generation and validation).

SUMMARY OF THE INVENTION

The Applicant has observed that offloading the handling of iSCSI PDUs' CRCs is not an easy task, mainly for the fact that the iSCSI PDUs are viewed, at the TCP layer level, merely as a byte stream, without any separation between header and payload portions, nor between PDU and PDU. This makes it difficult to calculate the CRCs "on the fly", and management of TCP retransmits is particularly critical, for the fact that the TCP segments to be retransmitted may fall anywhere inside an iSCSI PDU, or cross the boundary between two iSCSI PDUs.

In order to calculate the CRCs during a TCP retransmit operation, it should be necessary to locate the boundaries of the iSCSI PDUs based on the not-acknowledged TCP segment sequence number, read the entire PDU, and thus recalculate the CRC; locating PDUs' boundaries using the TCP sequence number is a complex task, and reading an entire PDU to retransmit a single TCP segment negatively impacts on performance and memory bandwidth.

In view of the state of the art outlined in the foregoing, and of the problems evidenced, the Applicant has tackled the general problem of how to reduce the burden on a data processing unit of, e.g., a host PC, workstation, or a server machine of a computer network of managing the low-level, iSCSI/TCP/IP protocol-related aspects of data transfer over the network.

In particular, the Applicant has faced the problem of improving the currently known TOEs, by providing a TOE that at least partially offloads the tasks of processing the iSCSI/TCP/IP-related aspects of data transfer over computer networks, not only offloading the TCP/IP processing.

Even more particularly, the Applicant has faced the problem of how to efficiently offload from a host processing unit the management of PDUs' CRCs during both transmit and, when necessary, retransmit of TCP segments.

According to an aspect of the present invention, a method as set forth in appended claim 1 is proposed, for offloading from a host data processing unit iSCSI TCP/IP processing of data streams to be transmitted over a computer network, and particularly for offloading, from the host data processing unit, the generation of data corruption-detection digests for iSCSI PDUs to be transmitted as TCP segments over respective TCP connections.

The method comprises: having an iSCSI layer processing software executed by the host data processing unit provide a command descriptor list containing command descriptors adapted to identify portions of at least one iSCSI PDU to be transmitted, said command descriptor list including data corruption-detection digest descriptors, each one associated with a respective PDU data corruption-detection digest;

having an iSCSI processing offload engine transmit the iSCSI PDU over the respective TCP connection, based on the descriptors in the command descriptor list, wherein said transmitting includes:

calculating the iSCSI PDU data corruption-detection digest during the transmitting, and save the calculated data corruption-detection digest in the corresponding data corruption-detection digest descriptor in the command descriptor list.

Other aspects of the present invention relates to an iSCSI TCP/IP offload engine as set forth in claim 9, to a method (and related computer program) of managing iSCSI processing under the control of a data processing unit as set forth in appended claim 10.

BRIEF DESCRIPTION OF THE DRAWINGS

The features and advantages of the present invention will be made apparent by the following detailed description of an embodiment thereof, provided merely by way of a non-limitative example, description that will be conducted making reference to the attached drawings, wherein.

DETAILED DESCRIPTION OF THE PREFERRED EMBODIMENT(S)

Figure 1:
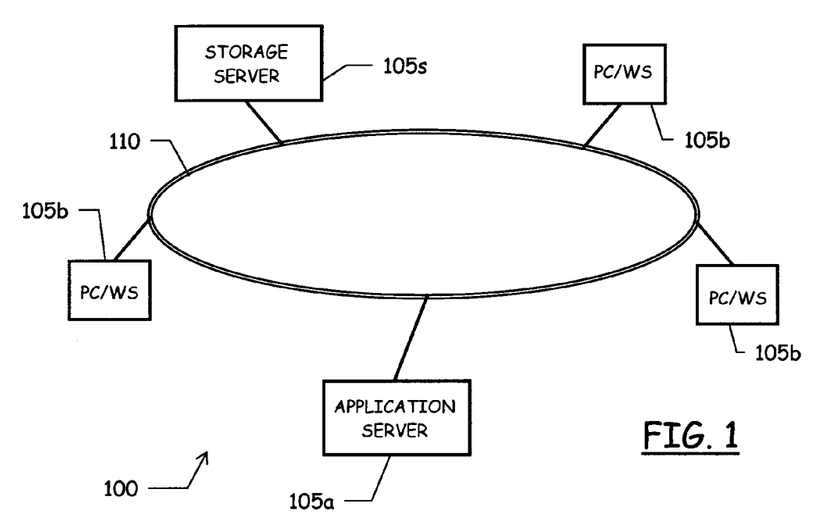
FIG. 1 is a schematic view of an exemplary computer network, particularly a TCP/IP-based network and, even more particularly, an Ethernet network.

With reference to the drawings, and particularly to FIG. 1, an exemplary computer network 100 is schematically shown. The computer network 100 is a packet-based data network, and may for example be the LAN of an enterprise, a bank, a public administration, a SOHO environment or the like, or a WAN, or any type of network, the specific type of network and its destination being not a limitation for the present invention.

The computer network 100 comprises a plurality of network components 105a, 105b, 105s, for example Personal Computers (PCs), workstations, machines used as file servers and/or application servers, printers, mass-storage devices and the like, networked together, by means of a communication medium schematically depicted in FIG. 1 and denoted therein by reference numeral 110.

The computer network 100 is in particular a TCP/IP-based network, i.e. a network relying on the TCP/IP protocol for transporting data, and is for example an Ethernet network, which is by far the most popular architecture adopted for LANs. In particular, and merely by way of example, the computer network 100 may be a 1 Gbps or a 10 Gbps Ethernet network. The network communication medium 110 may be a wire link or an infrared link or a radio link.

It is observed that although in the description which will be conducted hereinafter reference will be made by way of example to an Ethernet network, the present invention is not limited to any specific computer network configuration, being applicable to any computer network over which, for the transfer of storage data between different network components, the iSCSI protocol is exploited.

In the following, merely by way of example, it will be assumed that the computer network 100 includes, among its components, an application server computer, in the shown example represented by the network component 105a, i.e. a computer, in the computer network 100, running one or more application programs of interest for the users of the computer network, such users being connected to the network 100 and exploiting the services offered by the application server 105a by means of respective user's Personal Computers (PCs) and/or workstations 105b. It will also be assumed that the computer network 100 includes a storage component, for example a storage server or file server, in the shown example represented by the network component 105s. Other components of the network 100 may include for example a Network Array Storage (NAS).

Figure 2:
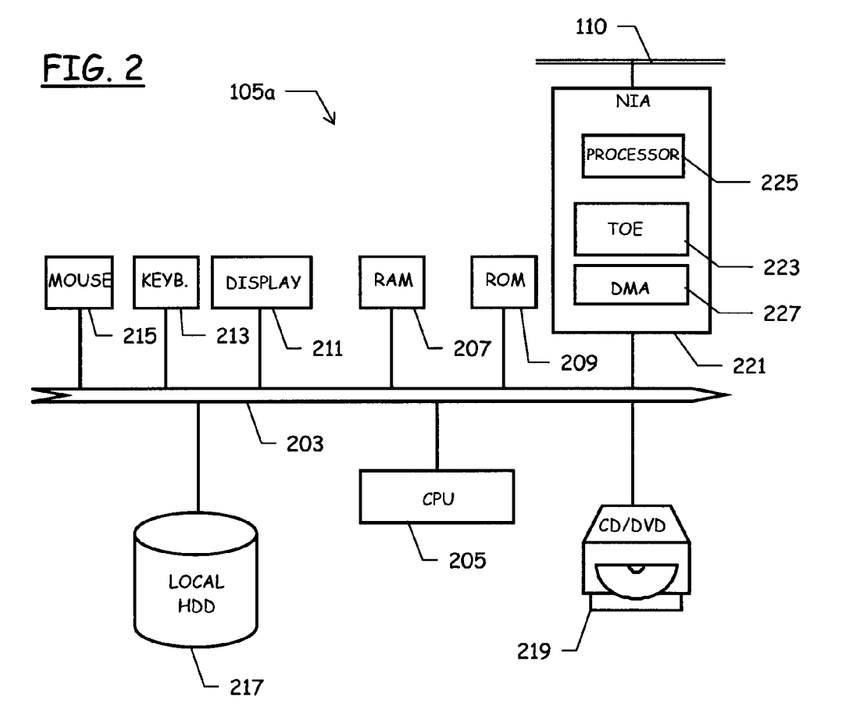
FIG. 2 shows the main functional blocks of a generic computer of the computer network of FIG. 1, such as, for example, a user's PC or workstation, or a server computer (e.g., an application server)

As schematically shown in FIG. 2, a generic computer of the network 100, for example the application server computer 105a, comprises several functional units connected in parallel to a data communication bus 203, for example a PCI bus. In particular, a Central Processing Unit (CPU) 205, typically comprising a microprocessor, e.g. a RISC processor (possibly, the CPU may be made up of several distinct and cooperating CPUs), controls the operation of the application server computer 105a; a working memory 207, typically a RAM (Random Access Memory) is directly exploited by the CPU 205 for the execution of programs and for temporary storage of data, and a Read Only Memory (ROM) 209 stores a basic program for the bootstrap of the production server computer 105a. The application server computer 105a may (and normally does) comprise several peripheral units, connected to the bus 203 by means of respective interfaces. Particularly, peripheral units that allow the interaction with a human user may be provided, such as a display device 211 (for example a CRT, an LCD or a plasma monitor), a keyboard 213 and a pointing device 215 (for example a mouse or a touchpad). The application server computer 105a also includes peripheral units for local mass-storage of programs (operating system, application programs, operating system libraries, user libraries) and data, such as one or more magnetic Hard-Disk Drivers (HDD), globally indicated as 217, driving magnetic hard disks, and a CD-ROM/DVD driver 219, or a CD-ROM/DVD juke-box, for reading/writing CD-ROMs/DVDs. Other peripheral units may be present, such as a floppy-disk driver for reading/writing floppy disks, a memory card reader for reading/writing memory cards, a magnetic tape mass-storage storage unit and the like.

The application server computer 105a is further equipped with a Network Interface Adapter (NIA) card 221 for the connection to the computer network 100 and particularly for accessing, at the very physical level, the communication medium 110. The NIA card 221 is a hardware peripheral having its own data processing capabilities, schematically depicted in the drawings by means of an embedded processor 225, that can for example include a microprocessor, a RAM and a ROM, in communication with the functional units of the computer 105a, particularly with the CPU 205. The NIA card 221 preferably includes a DMA engine 227, adapted to handle direct accesses to the storage areas of the computer 105a, such as for example the RAM and the local hard disks, for reading/writing data therefrom/thereinto, without the intervention of the CPU 205.

According to an embodiment of the present invention, a TCP/IP Offload Engine (TOE) 223 is incorporated in the NIA card 221, for at least partially offloading from the CPU 205 (the host CPU) of the application server 105a the heavy processing of the TCP/IP-related aspects of the data traffic exchanged between the application server 105a and, e.g., the storage server 105s or the user's PCs 105b.

In particular, in an embodiment of the present invention, the TOE 223 is adapted to enable the NIA card 221 performing substantial amount of protocol processing of the data to be transmitted not only at the TCP/IP levels, but up to the iSCSI layer, as will be described in greater detail later in this description.

Any other computer of the network 100, in particular the storage server 105s, has the general structure depicted in FIG. 2, particularly in respect of the NIA 221 with the TOE 223. It is however pointed out that the present invention is not limited to the fact that either one of or both the network components exchanging storage data according to the iSCSI protocol are computers having the structure depicted in FIG. 2: the specific structure of the iSCSI devices is not limitative to the present invention.

Figure 3:
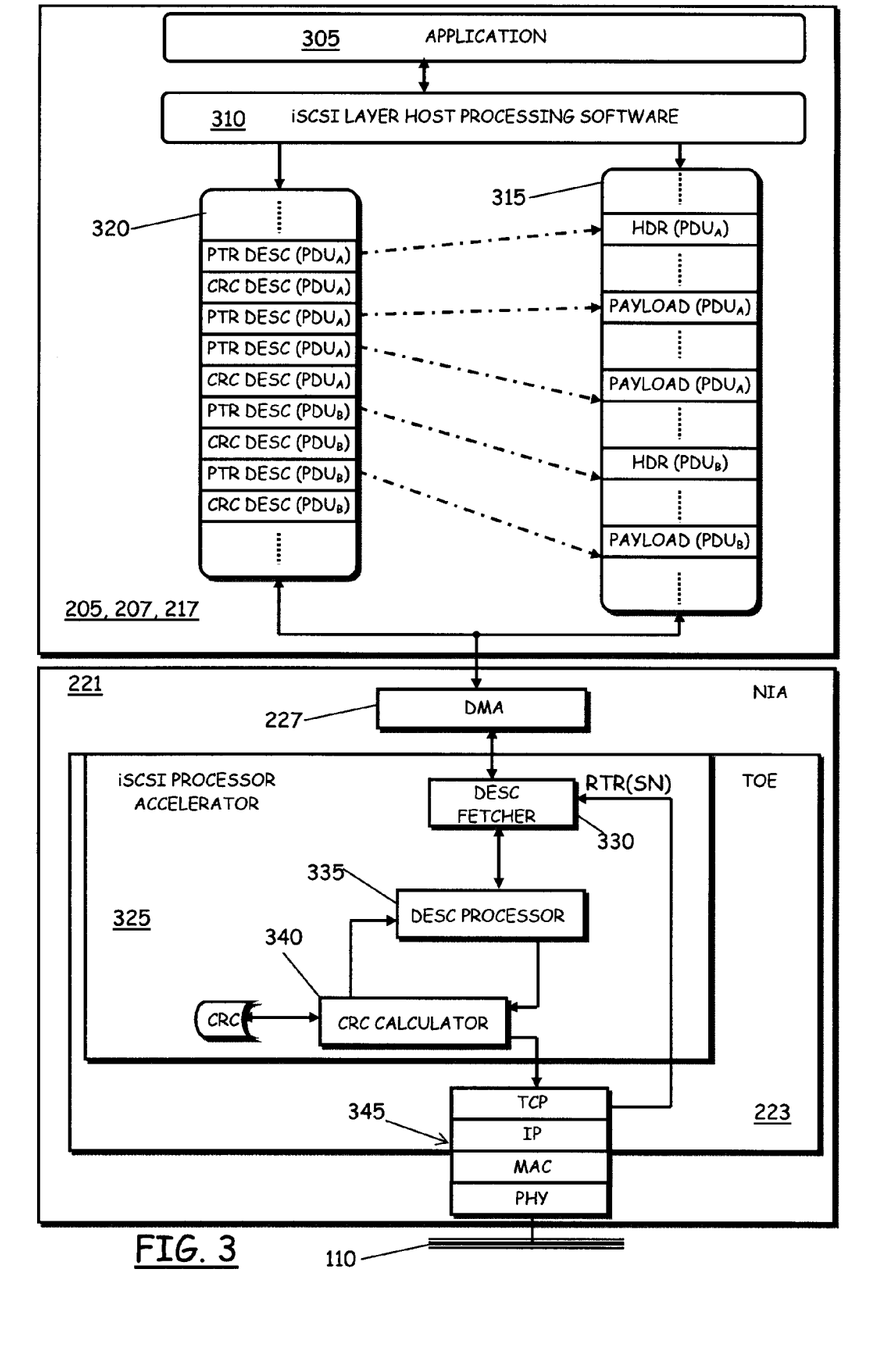
FIG. 3 shows the main functional blocks of a TCP/IP Offload Engine (TOE) with an iSCSI processing accelerator according to an embodiment of the present invention.

FIG. 3 is a representation, in terms of functional blocks relevant to the understanding of the exemplary invention embodiment herein described, of the internal structure of the NIA card 221 with the TOE 223 included therein, and of the interactions thereof with the host computer.

Reference numeral 305 identifies a generic application running in the host computer, in the example considered the application server 105a (i.e., a piece of software executed by the host CPU 205) which needs to exchange storage data with, e.g., the storage server 105s; the application 305 interacts with an iSCSI layer host processing software 310, still executed by the host CPU 205 of the application server 105a, and implementing all that part of iSCSI processing that is not offloaded from the host CPU. In particular, when the application 305 needs to send SCSI requests, or storage data, to the storage server 105s, the application 305 invokes the iSCSI layer host processing software 310, which manages the operations or preparing iSCSI PDUs to be sent to the storage server 105s.

Figure 4:
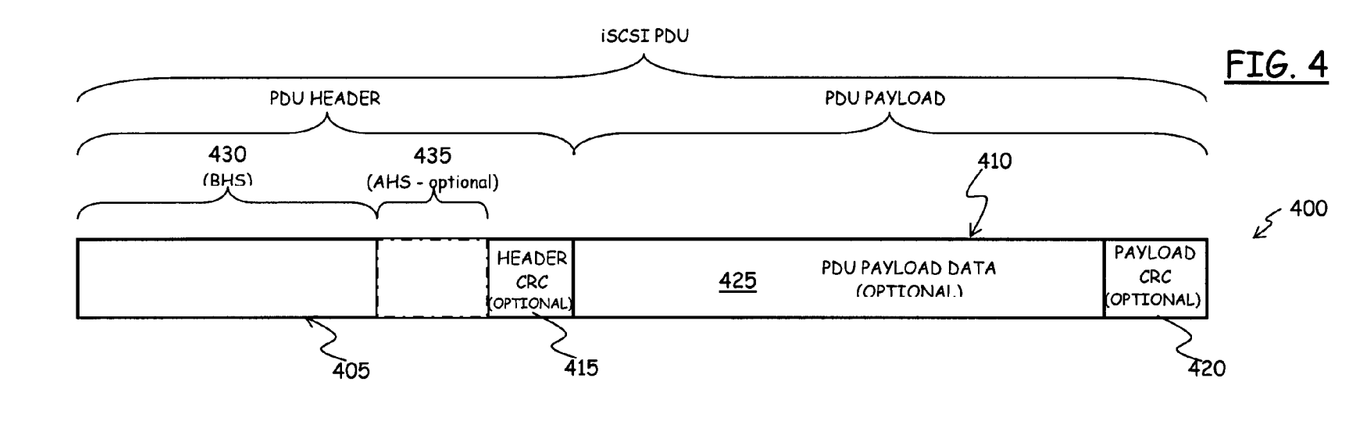
FIG. 4 depicts the structure of a generic iSCSI Protocol Data Unit (PDU)

In FIG. 4, the structure of a generic iSCSI PDU 400 is represented very schematically. Generally speaking, every iSCSI PDU 400 includes a PDU header portion 405 and, optionally, a PDU payload portion 410 (the presence of the PDU payload portion depends on the type of iSCSI PDU: some iSCSI PDUs do not carry data, and comprise only the header portion 405, without the payload portion). The iSCSI PDU 400 may include up to two data integrity protection fields or data corruption-detection digests, particularly two CRC (Cyclic Redundant Code) fields 415 and 420: a first CRC field 415 (typically, four Bytes) can be provided for protecting the information content of the PDU header portion 405, whereas the second CRC field 420 can be provided for protecting the information content of the PDU payload portion 425 (when present: the second CRC field 420 is absent in those iSCSI PDUs that do not include a payload). Either the header CRC 415, or the payload CRC 420, or both may be selectively enabled or disabled. The PDU 400 starts with a Basic Header Segment (BHS) 430; the BHS 430 has a fixed and constant size, particularly it is, currently, 48 Bytes long, and contains information adapted to completely describe the length of the whole PDU 400. The PDU header 405 may optionally include an additional portion, called Additional Header Segment (AHS) 435, that, if present (a situation identified by the fact that the field 430 contains a value different from zero) follows the BHS 430, and allows expanding the iSCSI PDU header 405 so as to include additional information over those provided by the BHS 430.

Figure 5:
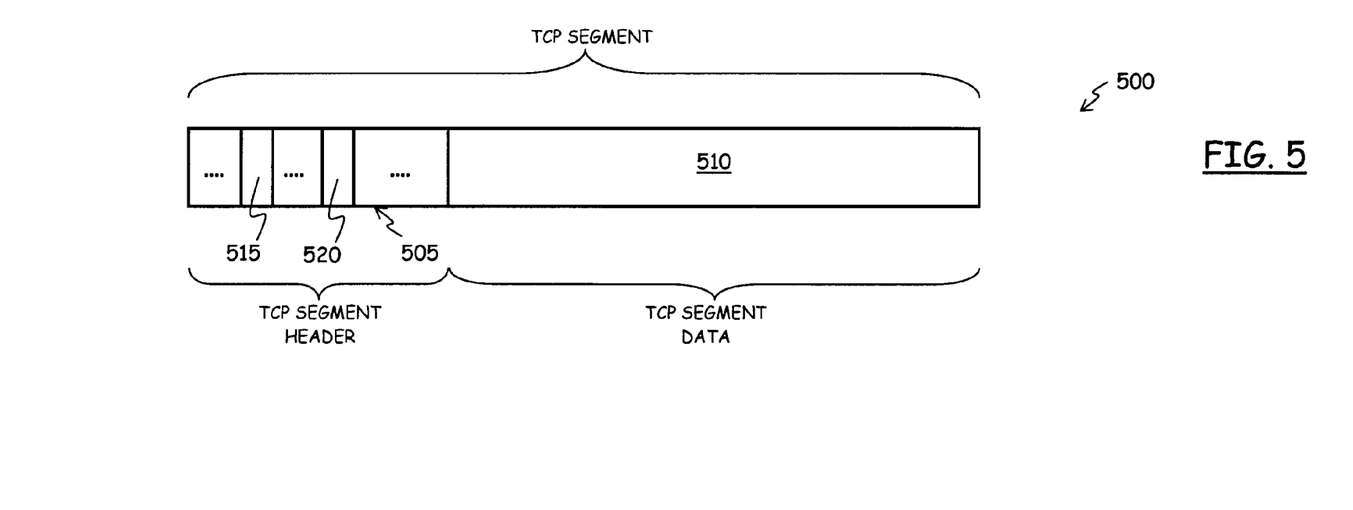
FIG. 5 depicts the structure of a generic TCP segment.

In order to be transmitted over the network 110, the iSCSI PDUs are to be transformed into TCP segments; in FIG. 5 there is schematically shown the structure of a generic TCP segment 500, which comprises a TCP segment header portion 505 and a TCP segment data portion 510. Roughly speaking, the TCP segment header portion 505 carries information such as the source port (a number identifying the application that originated the TCP segment), the destination port (a number identifying the application to which the TCP segment is destined on a receiving computer), the so-called "sequence number" 515 (a number, e.g. 32-bit long, identifying the position, within the entire byte stream for the TCP connection, of the first data byte in that TCP segment), and the checksum 520, whose value is based on the content of the whole TCP segment (i.e., header and data portions). The TCP segment data portion 510 (which, similarly to the case of the iSCSI PDUs, is optional) includes the data to be sent to the intended destination; this portion has a variable length, but it may not cause the whole TCP segment to exceed a predetermined maximum segment size.

According to an embodiment of the present invention, the transformation of iSCSI PDUs into TCP segments, and the subsequent transmission thereof over the network 110, is managed by the NIA 221, and particularly by the TOE 223. According to an embodiment of the present invention, the TOE 223 is also entrusted with the calculation of the CRCs (header CRC and payload CRC, where provided), during both the transmit and the retransmit phases of TCP segments.

In particular, according to an embodiment of the present invention, under request of the application 305, the iSCSI layer host processing software 310 prepares and places iSCSI PDU header and payload portions in a first storage area 315 of the host computer 105a (for example, an area of the working memory 207 of the computer 105a); it is observed that both the PDU header and the PDU payload portions may be made up of more than one data chunk, each chunk being stored in a respective region of the storage area 315. For the sake of simplicity, in FIG. 3 only two iSCSI PDUs have been considered, a first iSCSI PDU PDUa, comprising a header portion HDR(PDUa) and a payload portion PAYLOAD(PDUa), made up of two chunks, and a second iSCSI PDU PDUb, comprising a header HDR(PDUb) and a data portion PAYLOAD(PDUb);

Additionally, the iSCSI layer host processing software 310 prepares command descriptors of the iSCSI PDU headers and payload portions, and posts the prepared descriptors to a second storage area 320 of the host computer 105a (for example, another area of the working memory of the computer 105a), thereby creating a descriptor list (hereinafter, the descriptor list will be identified by the same reference numeral as the storage area 320 where it is stored). The descriptors prepared by the iSCSI layer host processing software 310 and posted in the descriptor list 320 include in particular pointers (and for this reason they will also be referred to as "pointer descriptors"—PTR DESC in the drawing) to the regions of the first storage area 315 where the corresponding iSCSI PDUs header and payload portions have been placed. Considering the simple example of FIG. 3, the regions of the storage area 315 that contain the header portions and the payload portions of the iSCSI PDUs PDUa and PDUb are pointed to by respective pointer descriptors PTR DESC(PDUa) and PTR DESC(PDUb); in particular, as far as the payload portion of the PDU PDUa is concerned, two distinct pointer descriptors PTR DESC(PDUa) are posted in the descriptor list 320, one for each of the two data chunks.

According to an embodiment of the present invention, in addition to the pointer descriptors PTR DESC(PDUa) and PTR DESC(PDUb) in respect of the iSCSI PDUs' header and payload portions, the iSCSI layer host processing software 310 also places, in the descriptor list 320, further descriptors, hereinafter referred to as "CRC descriptors" (like the descriptors indicated as CRC DESC (PDUa) and CRC DESC (PDUb) in FIG. 3); as will be explained later, according to an embodiment of the present invention the CRC descriptors are used to indicate separations iSCSI PDUs header and payload portions (i.e., a CRC descriptor is provided between a pointer descriptor pointing to an iSCSI PDU header portion and a pointer descriptor pointing to an iSCSI PDU payload portion, and vice versa). In other words, a generic CRC descriptor is used either to indicate a separation between an iSCSI PDU header (not including CRC part of the header) and an iSCSI PDU payload of the same PDU, or to indicate a separation between an iSCSI PDU payload and the header of next iSCSI PDU. The CRC descriptors are thus used as an indication of "boundaries" of the CRC calculation, to be performed (as will be described later) by the offload engine.

Moreover, according to an embodiment of the present invention, the generic CRC descriptor contains an indication of whether the respective CRC field (header CRC or payload CRC) is enabled or not, and, in the affirmative case, the CRC descriptor is used as placeholder for the CRC to be calculated by the TOE, as will be described in greater detail later on.

The descriptors (pointer descriptors and CRC descriptors) in the descriptor list 320 acts as a control structure for the processing of the iSCSI PDUs by the TOE.

According to an embodiment of the present invention, the TOE 223 is provided with a DMA engine 227 by means of which it accesses the storage areas 315 and 320 of the host computer 105a; the DMA engine 227 used for the purposes of iSCSI PDU processing may be the same DMA engine already embedded in the NIA 221 for different purposes; however, this is not to be construed as a limitation of the present invention. The TOE 223 includes an iSCSI processing accelerator 325, adapted to offload from the host CPU 205 some of the iSCSI processing necessary for transmitting iSCSI PDUs, and particularly the tasks of calculating the iSCSI PDU CRCs, and properly managing the possible retransmissions; schematically, the iSCSI processing accelerator 325 comprises a descriptor fetcher 330, adapted to fetch pointer descriptors from the descriptor list 320, exploiting the DMA engine 227. The descriptor fetcher 330 interacts with a descriptor processor 335, adapted to process the descriptors fetched by the descriptor fetcher 330. In particular, the descriptor processor 335 is capable of exploiting the information contained in the fetched descriptor for retrieving, from the storage area 315, the iSCSI PDU header or payload portions to which the descriptor points, exploiting the DMA engine 227. The descriptor processor 335 passes the retrieved iSCSI PDU header/payload portion to a CRC calculator 340, which calculates the CRC "on the fly". The CRC calculator 340 passes the iSCSI PDU header/payload portions received from the descriptor processor 335 to lower layers of the Open Systems Interconnect (OSI) "layers stack" model set forth by the International Organization for Standardization (ISO), particularly to lower-layer interface devices 345 adapted to transform the iSCSI PDUs (viewed as a simple byte stream) into TCP segments, and to transmit TCP/IP data packets over the network 110 (in particular, the lower-layer devices include TCP-layer devices, IP-layer devices, Media Access Control—MAC—layer devices, responsible of controlling the access to the network communication medium 110, and physical-level interface devices, implementing the PHYsical—PHY—layer, handling the basic, physical details of the communication through the network communication medium 110).

Figure 6:
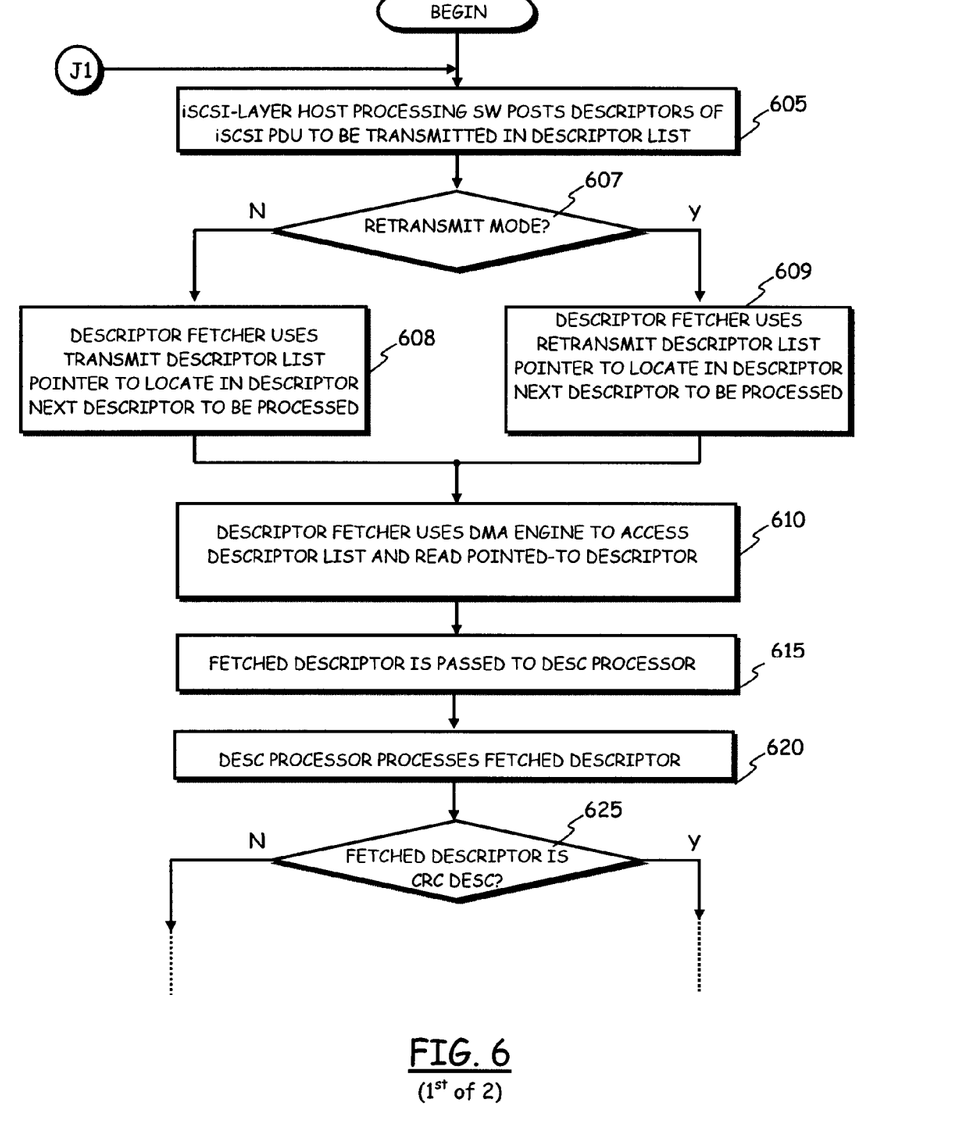
FIG. 6 is a very simplified flowchart illustrating the operation of the iSCSI processing accelerator of FIG. 3, in a transmit and retransmit operations performed according to an embodiment of the present invention.

The operation of the TOE 223 will be now explained, with the help of the schematic flowchart depicted in FIG. 6, which reassumes a transmit and retransmit operation of TCP segments (where a TCP segment retransmit operation is intended to be an operation that involves the retransmission of one or more already transmitted TCP segments, which becomes necessary when the intended destination, e.g. the storage server 105*s*, does not acknowledge receipt).

Referring to FIG. 6, as shown in step 605, when the application 305 needs to send SCSI requests/data to, e.g., the storage server 105*s*, the iSCSI layer host processing software 310 prepares iSCSI PDUs and puts the respective header HDR(PDUa), HDR(PDUb) and payload PAYLOAD(PDUa), PAYLOAD(PDUb) portions into the storage area 315, preparing and posting corresponding pointer descriptors PTR DESC(PDUa), PTR DESC(PDUb) in the descriptor list 320 (block 605). According to the presently described embodiment of the invention, the iSCSI layer host processing software 310 also prepares and posts into the descriptor list 320 the CRC descriptors CRC DESC(PDUa), CRC DESC(PDUb): a CRC descriptor is in particular posted into the descriptor list 320 as a separation between a pointer descriptor referring to a PDU header portion and a following pointer descriptor referring to a PDU payload portion of the same PDU, or referring to a PDU header portion of a following PDU: thus, a CRC descriptor is indicative of a boundary for CRC calculation: either an boundary internal to a generic iSCSI PDU, between the header and payload portion of a same PDU, or a boundary between two adjacent, consecutive PDUs; roughly speaking, the generic CRC descriptor indicates that a CRC calculation process has to be terminated (and a new CRC calculation process has to start).

Pointers to the descriptor list 320 are held by the offload engine, and such pointers are exploited by the descriptor fetcher 330 to locate, in the descriptor list, descriptors to be process. In particular, a transmit pointer and a retransmit pointer are provided for: the transmit pointer is used to keep track of the descriptors to be processed in a transmit operation, whereas the retransmit pointer is exploited to locate the descriptors to be processed in a retransmit operation.

The descriptor fetcher 330 ascertains whether a retransmit operation has been requested by the lower TCP processing layers (decision block 607).

In the negative case (exit branch N of decision block 607—the retransmit case is considered later), the descriptor fetcher 330 uses the transmit-mode descriptor list pointer to locate the next descriptor to be processed in the descriptor list 320 (block 608).

The descriptor fetcher 330, using the DMA engine 227, accesses the descriptor list 220, and reads the content of a first descriptor stored therein (block 610); for example, the descriptor list 320 is be managed according to a "first-in first-out" criterion: the descriptor fetcher 330 reads the descriptors in the order they have been posted into the descriptor list 320.

The descriptor fetcher 330 then passes the fetched descriptor to the descriptor processor 335 (block 615).

The descriptor processor 335 processes the fetched descriptor (block 620). In particular, the descriptor processor 335 checks (decision block 625) whether the fetched descriptor is a CRC descriptor (like the descriptors indicated as CRC DESC (PDUa) and CRC DESC (PDUb) in FIG. 3). In the negative case (exit branch N of decision block 625), the descriptor processor 330, using the DMA engine 227, accesses the storage area 315 and retrieves therefrom the iSCSI PDU header/payload portion (or chunk or portion) pointed to by the pointer descriptor being processed (block 630). The fetched PDU header/payload portion is then passed to the CRC calculator 340 (block 635), which calculates the CRC "on the fly" (block 640). The fetched PDU header/payload portion (or chink of portion) is then passed to the lower processing layers 345, for completing the transformation into TCP/IP segments and for transmitting them over the network 110 (block 645).

The operation flow jumps back to the beginning, as schematically represented by the connector J1, to fetch/process subsequent descriptors in the descriptor list 320.

If instead the descriptor processor 335 finds that the fetched descriptor is a CRC descriptor (exit branch Y of decision block 625), the descriptor processor 335 passes a content of the fetched CRC descriptor to the CRC calculator 340 (block 650). The CRC calculator completes the "on-the-fly" calculation of the CRC (block 655), and then checks the fetched CRC descriptor to determine whether the information contained therein specifies that the corresponding PDU CRC field (which may be either a header CRC, or a payload CRC) is enabled (decision block 660). In the affirmative case (exit branch Y of decision block 660) the CRC calculator 340 passes the calculated CRC value to the lower processing layers 345, for the inclusion thereof in the TCP segment to be transmitted (block 665).

Then, the CRC calculator 340 ascertains whether the current operation is a retransmit operation (decision block 667). In the negative case (exit branch N of decision block 667), the CRC calculator 340 (either directly, or by intervention of the descriptor processor 335) writes the calculated CRC value back into the descriptor list 320, in the position where the corresponding CRC descriptor was previously fetched (block 670); to this end, the DMA engine 227 is exploited, for accessing the storage area of the host computer where the descriptor list is stored. To this purpose, the descriptor fetcher 330 is invoked, which keeps memory of the addresses of last unprocessed descriptors fetched from the descriptor list 320.

The procedure ends (unless there are other descriptors in the descriptor list 220, in which case the operation flow jumps back to the beginning, as schematically represented by the connector J1).

In other words, the CRC descriptors, which are prepared and posted by the iSCSI layer host processing software 310 in the descriptor list 220, are not merely used as indications of separation between iSCSI PDUs' header and data portions, i.e. as indications of PDUs' boundaries, and as descriptors of whether the provision of CRCs in the iSCSI PDUs is enabled or not: the CRC descriptors in the descriptor list are additionally used as "containers" of the calculated CRC value for the respective PDU CRC field.

The above-described operation greatly simplifies the management by the TOE 223 of retransmit operations, as will be now described referring again to the flowchart FIG. 6; a retransmit is usually needed when the intended destination, for example the storage server 105s, does not acknowledge receipt of one or more TCP segments.

As schematically depicted in FIG. 3, the TCP processing layer in the lower processing layers 345 provides the TOE 223, particularly the descriptor fetcher 330, with an indication RTR(SN) of the necessity to perform a retransmit of one or more TCP segments, together with the sequence number of the first non-positively acknowledge TCP segment; the sequence number allows identifying the first byte within the transmitted byte stream that has not been acknowledge. When the description fetcher 330, being informed by the lower TCP processing layers, recognizes that a retransmit operation is requested (decision block 607, exit branch Y), the descriptor fetcher 330 uses the retransmit pointer to locate, in the descriptor list 220, the descriptor from which the retransmit operation has to begin (block 609); such a descriptor corresponds to the portion of iSCSI PDU header/data that includes the first byte not positively acknowledged by the destination.

As in the previously described transmit operation, the descriptor fetcher 330, using the DMA engine 227, accesses the descriptor list 220, and reads the content of the located descriptor (block 610).

The descriptor fetcher 330 then passes the fetched descriptor to the descriptor processor 335 (block 615).

The descriptor processor 335 processes the fetched descriptor (block 620), checking whether the fetched descriptor is a CRC descriptor (decision block 625). In the negative case (exit branch N of decision block 725), the descriptor processor 330, using the DMA engine 227, accesses the storage area 315 and retrieves therefrom the iSCSI PDU header/payload portion (or chunk of portion), pointed to by the pointer descriptor being processed, which needs to be retransmitted (block 630). The fetched PDU header/payload portion (or chunk of portion) is then passed to the CRC calculator 340 (block 635): according to an embodiment of the present invention, the CRC calculator 340 performs as well the CRC calculation, irrespective of the fact that a retransmit operation is being conducted (block 640); however, it is pointed out that the CRC calculation might be dispensed for in retransmit mode, even though this may slightly complicate the implementation; the fetched PDU header/payload portion (or chunk of portion) is then passed over to the lower processing layers 345, for completing the transformation into TCP segments and for transmitting the segments over the network 110 (block 745). In particular, when the TCP processing logic requests from descriptor fetcher data at a specific location (byte sequence number), it also indicates whether this data is retransmitted. This information is passed by the descriptor fetcher to descriptor processor along with the other control information.

The operation flow jumps back to the beginning, as schematically represented by the connector J1, to fetch/process subsequent descriptors in the descriptor list 320.

If instead the descriptor processor 335 ascertains that the fetched descriptor is a CRC descriptor (exit branch Y of decision block 625), the descriptor processor 335 passes a content of the fetched CRC descriptor to the CRC calculator 340 (block 650). If the CRC calculator 340, looking at the information contained in the fetched CRC descriptor, ascertains that the corresponding CRC field is enabled, the CRC calculator 340 is adapted to recognize that the content of the fetched CRC descriptor actually corresponds to the previously calculated CRC value, i.e., to the CRC value that the CRC calculator 340 calculated "on the fly" during the preceding transmit operation. Thus, the CRC calculator 340 completes the CRC calculation as if in transmit mode (block 655), but instead of using the CRC value calculated "on-the-fly" during the retransmit operation, it passes over the content of the fetched CRC descriptor, i.e., the previously-calculated CRC value, to the lower processing layers 345, for the inclusion thereof in the TCP segment to be retransmitted (block 665).

The procedure ends, unless there are other descriptors in the descriptor list 220 to be processed, in which case the operation flow jumps back to the beginning, as schematically represented by the connector J1).

Thus, as can be appreciated, according to an embodiment of the present invention, CRC descriptors, which are iSCSI command descriptors prepared by the iSCSI layer host processing software for indicating whether the PDUs' CRC fields are enabled, are exploited for marking the boundaries of portions of the data stream prepared by the iSCSI layer host processing software that need CRC calculation, and additionally the CRC descriptors are also exploited as "place holders", containers of the calculated CRC values; in this way, during a transmit operation, when the iSCSI accelerator in the TOE encounters a CRC descriptor, the iSCSI accelerator understands that the CRC calculation has to be terminated, and the calculated CRC value written back into the CRC descriptor. During a subsequent retransmit operation, there is no need to either find the boundaries of the iSCSI PDUs, or to read the entire PDU (header or payload) and recalculated the CRC: it is sufficient to read from the CRC descriptor (when it is encountered) the previously stored CRC value, calculated during the transmit operation.

It is observed that multiple TCP connections may be handled at the same time; for example, a generic iSCSI session may include multiple TCP connections, and/or more than one iSCSI sessions may be simultaneously active. In this case, it may happen that, while processing a generic ISCSI PDU on a specific TCP connection, handling of such a TCP connection has to be stopped, due for example to TCP flow control or congestion control restrictions, and another TCP connection has to be served instead. In such a case, the intermediate CRC, calculated by the CRC calculator up to that time for the part of PDU header/data that has been transmitted, is stored in the respective TCP connection context. The next time that TCP connection is handled, the CRC calculation is restarted from where it was previously stopped, and the previously calculated CRC, stored in the respective TCP connection context, is used.

To this purpose, the TCP processing layer is preferably such that the TCP Message Segment Size (MSS) is 4-byte aligned, i.e., the data size is a multiple of 4 bytes. Additionally, in a retransmit operation, retransmitted TCP segments are not mixed up with newly transmitted TCP segments.

The present invention allows implementing an efficient offloading, to an offload engine, of the iSCSI processing aspects concerning in particular the generation of CRCs, making the management of TCP segment retransmits relatively easy. In particular, thanks to the present invention the retransmits can be accomplished without the need of keeping additional information in respect of the ISCSI PDUs being transmitted, nor of locating iSCSI PDU boundaries. In particular, there is no need to recomputing the CRC value during retransmit, because the CRC values already calculated during the previous transmit phase are exploited.

Although the present invention has been disclosed and described by way of some embodiments, it is apparent to those skilled in the art that several modifications to the described embodiments, as well as other embodiments of the present invention are possible without departing from the scope thereof as defined in the appended claims.

What is claimed is:

1. A method of offloading, from a host data processing unit, iSCSI processing of data transfers, the method comprising:
generating data corruption-detection digests for iSCSI PDUs to be transmitted as TCP segments over respective TCP connections using an offload engine with a network interface adapter;
managing transformation and subsequent transmission of data segments through said network interface adapter;
providing, by an iSCSI layer processing software executed by the host data processing unit, a command descriptor list containing command descriptors adapted to identify portions of at least one iSCSI PDU to be transmitted, said command descriptor list including data corruption-detection digest descriptors, each corruption-detection digest descriptor indicative of a boundary for performing a CRC calculation, said boundary being internal to a generic iSCSI PDU;
transmitting, via an iSCSI processing offload engine, the identified portion of said at least one iSCSI PDU over the respective TCP connection, based on the descriptors in the command descriptor list, wherein said transmitting includes:
calculating the iSCSI PDU data corruption-detection digest during the transmitting, and
saving the calculated data corruption-detection digest in the corresponding data corruption-detection digest descriptor in the command descriptor list, wherein said command descriptors and said corruption-detection digest descriptors of said command descriptor list are a control structure directly used in the processing of the iSCSI PDUs by the offload engine.

2. The method according to claim 1, in which said command descriptors include, for each iSCSI PDU to be transmitted, at least one descriptor referring to a header portion of the iSCSI PDU to be transmitted, and a data corruption-detection digest descriptor relating to the data corruption-detection digest of the iSCSI PDU header portion.

3. The method according to claim 2, in which in case the iSCSI PDU to be transmitted includes a payload portion, the command descriptors in respect of the iSCSI PDU additionally include at least one descriptor referring to the payload portion of the iSCSI PDU to be transmitted, and a data corruption-detection digest descriptor relating to the data corruption-detection digest of the iSCSI PDU payload portion.

4. The method according to claim 1, in which said transmitting includes: transmitting the calculated data corruption-detection digest based on a data corruption-detection digest enabling indication present in the corresponding data corruption-detection digest descriptor.

5. The method according to claim 1, in which said transmitting includes retransmitting at least one TCP segment, said retransmitting comprising: using the previously calculated data corruption-detection digest saved in the corresponding data corruption-detection digest descriptor.

6. The method according to claim 5, in which said retransmitting includes retransmitting the calculated data corruption-detection digest based on a data corruption-detection digest enabling indication present in the corresponding data corruption-detection digest descriptor.

7. The method according to claim 1, further comprising: in case handling of a first, currently-served TCP connection is switched to a second TCP connection, suspend a data corruption-detection digest calculation in respect of the first TCP connection and saving a calculated data corruption-detection digest in respect of the first TCP connection in the first TCP connection context.

8. The method according to claim 7, further comprising: when resuming the handling of the first TCP connection, retrieving the previously saved data corruption-detection digest, and restarting data corruption-detection digest calculation from where it was suspended.

9. An iSCSI TCP/IP offload engine adapted to offload, from a host data process unit, the processing of iSCSI data streams, comprising:
an iSCSI processor for executing a command descriptor list containing command descriptors for identifying portions of at least one iSCSI PDU:
an iSCSI PDU transmitter, for transmitting the iSCSI PDUs over the respective TCP connections using said command descriptor list,
said command descriptor list also including data corruption-detection digest descriptors, each said corruption-detection digest descriptor indicative of a boundary for performing a CRC calculation, said boundary being internal to a generic iSCSI PDU;
a data corruption-digest calculator for calculating iSCSI PDU data corruption-detection digests, said data corruption-detection digests to be saved in the corresponding data corruption-detection digest descriptors in the command descriptor list such that data can be assembled and or reassembled as a byte stream selectively, wherein said command descriptors and said corruption-detection digest descriptors of said command descriptor list are a control structure directly used in the processing of the iSCSI PDUs by the offload engine.

10. A method of managing iSCSI processing under the control of a host data processing unit, comprising: providing to an offload engine a command descriptor list containing command descriptors adapted to identify portions of an iSCSI PDU to be transmitted, said command descriptor list including data corruption-detection digest descriptors, each corruption-detection digest descriptor indicative of a boundary for performing a CRC calculation, said boundary being internal to a generic iSCSI PDU, wherein said command descriptors and said corruption-detection digest descriptors of said command descriptor list are a control structure directly used in the processing of the iSCSI PDUs by the offload engine.

11. A non-transitory computer-readable storage medium having recorded thereon a computer program directly loadable into the working memory of a computer and adapted to perform, when executed, a method of managing iSCSI data transfers and processing under the control of a host data processing unit, the method comprising: providing to an offload engine a command descriptor list containing command descriptors adapted to identify portions of an iSCSI PDU to be transmitted, said command descriptor list including data corruption-detection digest descriptors, each corruption-detection digest descriptor indicative of a boundary for performing a CRC calculation, said boundary being internal to a generic iSCSI PDU, said program managing transformation and subsequent transmission of data segments using an Network Interface Adapter implemented in a TCP/IP offload engine, wherein said command descriptors and said corruption-detection digest descriptors of said command descriptor list are a control structure directly used in the processing of the iSCSI PDUs by the offload engine.

12. A non-transitory computer-readable storage medium having stored thereon a computer program directly loadable into the working memory of a computer and adapted to perform, when executed, a method of managing iSCSI processing under the control of a host data processing unit, the method comprising: providing to an offload engine a command descriptor list containing command descriptors adapted to identify portions of an iSCSI PDU to be transmitted, said command descriptor list including data corruption-detection digest descriptors, each corruption-detection digest descriptor indicative of a boundary for performing a CRC calculation, said boundary being internal to a generic iSCSI PDU, said program managing transformation and subsequent transmission of data segments using an Network Interface Adapter implemented in a TCP/IP offload engine, wherein said command descriptors and said corruption-detection digest descriptors of said command descriptor list are a control structure directly used in the processing of the iSCSI PDUs by the offload engine.

13. The method according to claim 1, said boundary being between the header and payload portion of a same PDU.

14. The method according to claim 1, wherein a boundary exists between two adjacent, consecutive PDUs.

15. The method according to claim 1, further comprising: fetching said command descriptors from the descriptor list, via a DMA engine; and, processing said fetched descriptors to identify said portions of said at least one iSCSI PDU.

16. The iSCSI TCP/IP offload engine according to claim 9, wherein said boundary is between the header and payload portion of a same PDU.

17. The iSCSI TCP/IP offload engine according to claim 9, wherein a boundary exists between two adjacent, consecutive PDUs.

18. The iSCSI TCP/IP offload engine according to claim 9, further comprising:
 a descriptor fetcher for fetching said command descriptors from said descriptor list, via a DMA engine; and,
 a descriptor processor configured for processing the descriptors fetched by the descriptor fetcher to identify said portions of said at least one iSCSI PDU.

* * * * *